United States Patent [19]

Derrell

[11] Patent Number: 5,248,439

[45] Date of Patent: Sep. 28, 1993

[54] EMULSION BREAKER APPARATUS AND METHOD

[75] Inventor: Scott J. Derrell, Houma, La.

[73] Assignee: Texaco Inc., White Plains, N.Y.

[21] Appl. No.: 932,472

[22] Filed: Aug. 20, 1992

Related U.S. Application Data

[63] Continuation of Ser. No. 661,943, Feb. 28, 1991, abandoned.

[51] Int. Cl.$^5$ .............................................. B01D 17/04
[52] U.S. Cl. ...................................... 210/708; 210/747; 210/201; 210/522; 210/532.1
[58] Field of Search ............... 210/201, 708, 706, 747, 210/521, 522, 532.1, 538; 206/524.4, 213.1

[56] References Cited

U.S. PATENT DOCUMENTS

| | | | |
|---|---|---|---|
| 1,116,903 | 10/1914 | McLintock | 210/748 |
| 3,229,446 | 1/1966 | Sebastian | 55/53 |
| 3,529,720 | 9/1970 | Chablaik | 210/123 |
| 4,132,652 | 1/1979 | Anderson et al. | 210/242 |

*Primary Examiner*—Charles Hart
*Attorney, Agent, or Firm*—James J. O'Loughlin; Robert B. Burns

[57] ABSTRACT

An emulsion breaking apparatus for segregating a lesser specific gravity liquid from an emulsion by a gravity separation. A primary separating chamber within the apparatus receives a flow of the emulsion and directs said flow through a panel array which defines a tortuous path and one or more segregating compartments. One or more weirs formed in the panel array function to meter the lighter liquid which rises to the emulsion surface, into the one or more compartments by a gravity flow of the emulsion across said weir. A non-reactive gas introduced into the main separating chamber forms a non-oxidizing gaseous blanket above liquid in the apparatus to avoid corrosive action which might otherwise commence.

2 Claims, 2 Drawing Sheets

EMULSION BREAKER APPARATUS AND METHOD

This is a continuation of application Ser. No. 07/661,943, filed Feb. 28, 1991 now abandoned.

BACKGROUND OF THE INVENTION

Assuring the protection of the environment and maintaining its natural status, particularly at offshore locations where crude oil and gas are produced, is high on the agenda of any producing operation. Normally, particularly in the instance of crude oil production, upflowing liquid from a hydrocarbon containing reservoir usually includes a considerable amount of water, gas, drilling mud and other elements or components. In the instance of offshore producing structures or platforms, it is desirable to separate the liquid production flow, to break out only the crude oil and drilling mud, and to dispose of the residual water.

Since the water cannot be saved with any degree of practicality, it must be treated in a manner to assure virtual complete separation out of the usable crude oil.

As a matter of practicality, offshore structures of the type presently contemplated normally have a separating or emulsion breaking facility into which the aqueous crude oil emulsion is deposited. It can be appreciated that residue which normally accumulates on the platform, including salt water, drilling fluids, are also accumulated in the separating facility.

To assure that only relatively pollutant free water is returned to the surrounding environment, it is necessary that the hydrocarbon element be separated from the emulsion.

Toward providing a simple and effective means for treating a production stream from an offshore hydrocarbon containing reservoir, a novel emulsion breaking apparatus and treating method is provided. The apparatus is comprised primarily of a closed vessel or casing into which an array of panels is fastened in an emulsion flow path as well as defining segregated chambers into which lighter fluids can pass.

The panel array or arrangement in the casing defines a tortuous path along which the emulsion will flow in a generally quiescent manner, thus permitting solid materials to fall to the floor of the unit and lighter liquids to rise to the water's surface.

To avoid the corrosive effects which ordinarily occur in such units due to gases which are received with the crude oil from the underground reservoir, the emulsion breaker is tightly sealed with a removable cover plate and provided with a neutral environment comprised of a non-reactive blanketing gas. The latter will function to purge the closed casing of the corrosive gases as well as to concurrently shield exposed metallic surfaces of the unit from contact with gases or subsequently formed liquids which could promote corrosion.

It is therefore an object of the invention to provide a simple emulsion breaking apparatus that is capable of receiving an emulsion comprised primarily of a hydrocarbon liquid and water.

A still further object is to provide an apparatus capable of separating the produced fluid from an underground reservoir, which ordinarily contains elements which would promote corrosive damage to the apparatus by contacting the unprotected walls of the latter.

DESCRIPTION OF THE DRAWINGS

Referring to FIG. 1, an emulsion breaker or separating apparatus 10 is shown positioned at an offshore platform or marine structure 11. The latter would normally handle crude oil as well as water and other elements utilized in the operation but which cannot be discharged into the surrounding ocean. Platform 11 as shown, includes a deck 12 which is supported above the water's surface by a plurality of legs 13. The latter are embedded into the ocean floor 14 a sufficient distance to furnish the necessary support.

Emulsion breaker or separation apparatus 10 is positioned on deck 12 in such a manner, and at such a level that it will receive the emulsion which is to be broken and will be provided with means for depositing the usable hydrocarbon content into a pipeline or storage facility. The residue or remaining water which is free of hydrocarbon, can be discharged into the ocean by a conductor 9 so long as it is in a condition to avoid polluting the latter or even suggesting an indication such as by discoloration, that pollutants other than the water are being discharged.

Figure 1:
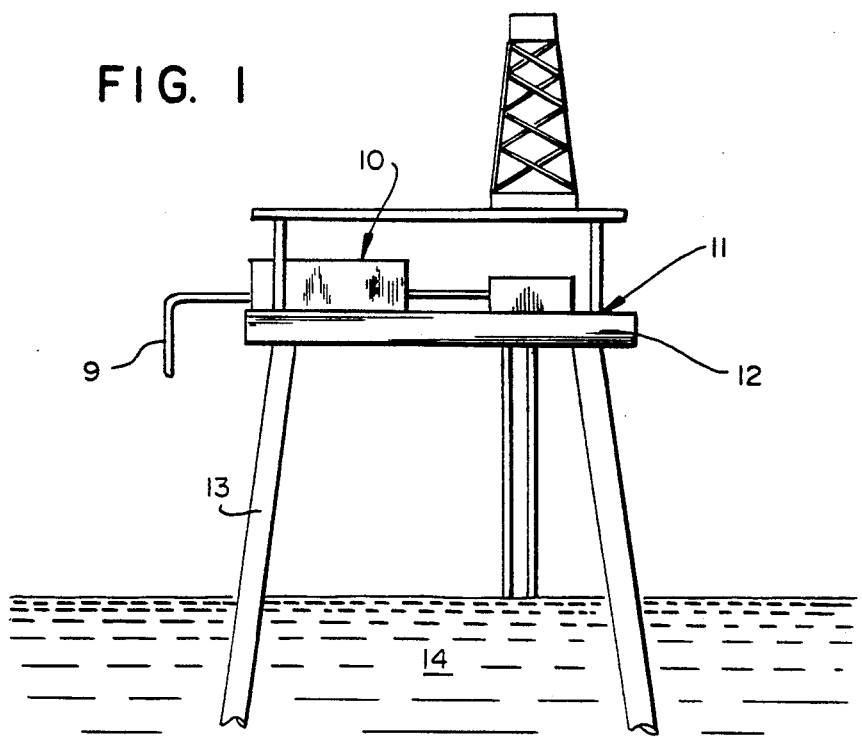
FIG. 1 is an environmental view of the emulsion breaker positioned on an offshore structure.
Figure 2:
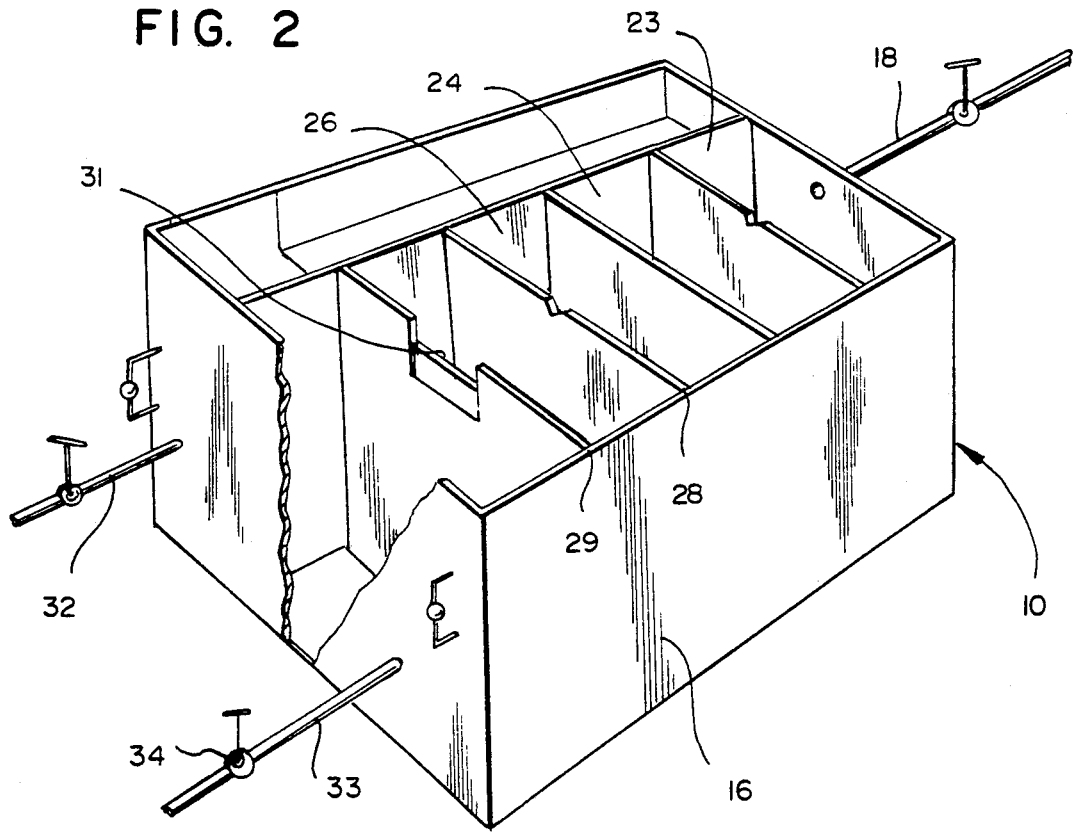
FIG. 2 is an enlarged elevation view of the emulsion breaker.
Figure 3:
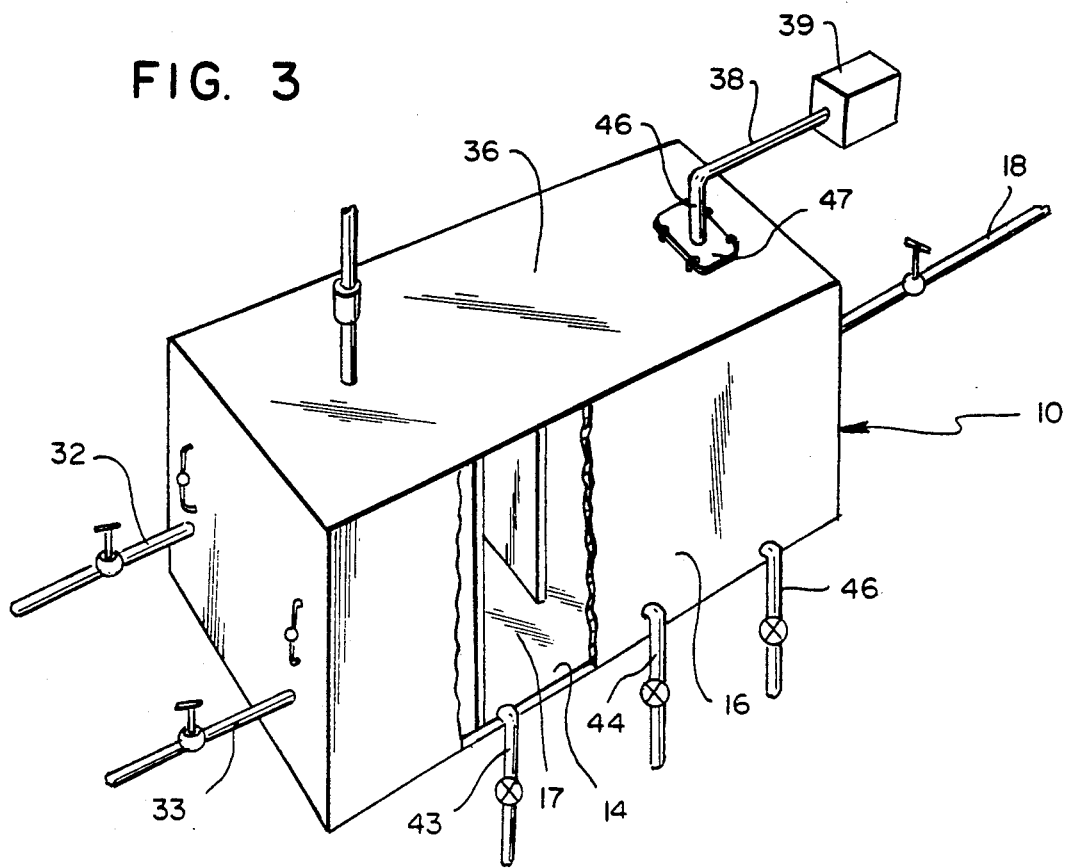
FIG. 3 is a side view of FIG. 2.
Figure 4:
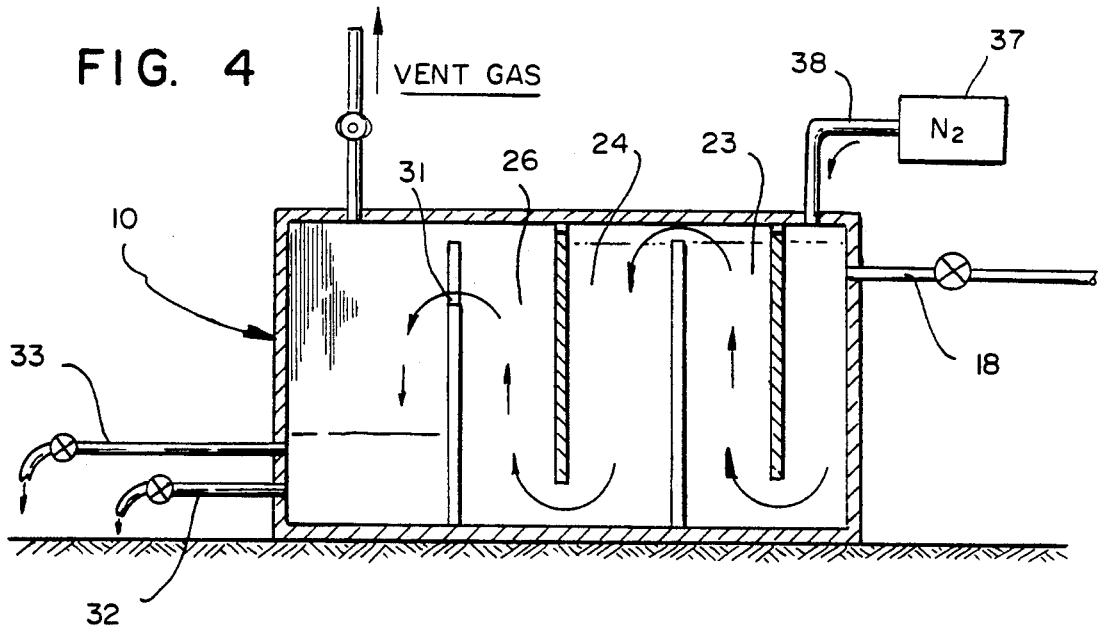
FIG. 4 is a top view of FIG. 2.

Referring to FIG. 2, emulsion breaker 10 includes primarily an enlarged container or vessel 16 fabricated of steel or similar durable material. The vessel has a sufficient capacity to handle the volume of production liquid received by the platform. Casing 16, as it will be hereinafter referred to, defines an internal separating chamber 17 into which untreated, usually degassed, emulsion to be broken, is initially introduced through an inlet means 18.

Normally, the incoming emulsion will be in a state of agitation and substantially free of gas. However, as the emulsion flows quiescently through emulsion breaker 10, the lighter or less dense liquids such as crude oil, will rise to the surface of the water to allow said hydrocarbons to be tapped off.

Internally, casing 16 is provided with an array of panels that are fastened to the casing walls and floor 14, and project inwardly to define a tortuous path through which the emulsion must flow as it moves to the unit's discharge end. Each segment of said path such as 19, 21, and 22, defined by parallel panels in the array, includes a segregated compartment 23, 24 and 26 into which the lighter segment or the crude oil will overflow as it rises to the emulsion surface.

In the last channel 27 of the tortuous path defined by adjacent panels 28 and 29, the latter is provided with an adjustable weir 31. Said weir can be raised or lowered to a desired level in accordance with the amount of crude oil in the emulsion and with the volume of emulsion being handled.

As shown in FIG. 2, emulsion flowing from inlet 18 to the outlet end of separating chamber 17, will encounter a plurality of segregated compartments 23, 24 and 26 into which the lighter crude oil component will overflow the top edge of the dividing panel, permitting the oil to fall into the segregating compartment. The latter are commonly communicated by a longitudinal channel which deposits crude oil into end compartment 31.

The downstream end of the emulsion breaker casing includes a discharge port 32 for crude oil which has been accumulated in the compartment 31. A second discharge port 33 is for water which makes up the entire, or at least a major part of the remaining aqueous element. Water discharge port 33 is provided with a butterfly valve 34 which is regulated in accordance with the volume inflow at the upstream end of the separating unit to maintain emulsion at a desired level as it flows through the tortuous path to the unit's discharge end.

To avoid the initiation or promotion of a corrosive problem which could arise within emulsion breaker 10, the latter is closed to the extent that it not only receives liquid emulsion, but is provided with a cover or removable roof 36 which sealably engages the sides of the unit thereby defining a closed separating chamber 17 within. The unit is further provided with one or more gas inlet means 37 which open into separating chamber 17 and are communicated by a line 38 to a source 39 of blanketing gas.

The gas will function to in effect sweep the internal chambers of any oxidizing elements which could otherwise accumulate. The blanketing element is preferably a non-reactive gas such as nitrogen and is metered into the emulsion breaker through flow control means 41 at a rate to maintain a desired pressure within the emulsion breaker without interfering with the flow of emulsion therethrough.

Incidental to the segregation of crude oil from the aqueous emulsion, incoming emulsion will, as noted, contain an amount of solid material which, during its passage through the separator chamber, gravitates to the floor 43. Periodically the floor is cleaned of such accumulated solids through a drain cocks such as 44 and 46 formed in each of the flow path components.

To allow access to the casing inner chambers for monitoring the non-reactive blanket, roof 16 is provided with at least one and preferably with a plurality of access ports. To assure the gas tight integrity of such ports, each is provided with a closure member 47 which can be sealably registered in the access port by bolting, dogging, or similar means.

Operationally, the inflow of blanketing gas to the emulsion separating chamber is regulated to assure that flow is maintained and that only a minimal pressure is built up.

It is understood that although modifications and variations of the invention can be made without departing from the spirit and scope thereof, only such limitations should be imposed as are indicated in the appended claims.

We claim:

1. Method from breaking an emulsion containing at least two liquids of different specific gravities and at least one corrosive gas, which method includes the steps of:
   providing a closed emulsion breaking separator having a separating chamber and at least one compartment which is segregated from said separating chamber to receive lighter liquid which separates from the emulsion,
   introducing a flow of said emulsion into said separating chamber to allow separation of the lighter of said at least two liquids, and the corrosive gas, from said emulsion and
   metering a stream of a non-oxidizing gas into said separating chamber in sufficient volume to displace said corrosive gas from the separating chamber, and to blanket exposed surfaces of said emulsion breaking separator.

2. An emulsion breaker for separating an aqueous production emulsion into discrete components, which emulsion comprises at last one low specific gravity liquid, a high specific gravity liquid, and contains corrosive gases, which emulsion breaker comprises:
   an elongated closed casing defining a separating chamber having opposite ends;
   an emulsion inlet at one end of said elongated casing for delivering said aqueous emulsion into said separating chamber;
   discharge means at the elongated casing other end communicated with said separating chamber to receive said discrete streams of heavier and lighter specific gravity liquids;
   a panel array in said separating chamber defining a tortious path through said elongated casing along which the emulsion flows while separating into said discrete components and releasing said contained corrosive gases;
   gas injection means at one end of said elongated casing for metering a stream of non-corrosive gas through the elongated casing to displace corrosive gases from said separating chamber; and
   gas discharge means at the casing other end for discharging corrosive and non-corrosive gases therefrom.

* * * * *